United States Patent
Mazzoni et al.

(10) Patent No.: US 7,633,851 B2
(45) Date of Patent: Dec. 15, 2009

(54) GENERATION OF A GUARD INTERVAL IN A DMT MODULATION TRANSMISSION

(75) Inventors: Simone Mazzoni, Grenoble (FR); Joel Cambonie, La Combe de Lancey (FR)

(73) Assignee: STMicroelectronics S.A., Montrouge (FR)

( * ) Notice: Subject to any disclaimer, the term of this patent is extended or adjusted under 35 U.S.C. 154(b) by 1197 days.

(21) Appl. No.: 10/761,708

(22) Filed: Jan. 21, 2004

(65) Prior Publication Data

US 2004/0151110 A1    Aug. 5, 2004

Related U.S. Application Data

(63) Continuation of application No. 09/491,685, filed on Jan. 26, 2000, now abandoned.

(30) Foreign Application Priority Data

Jan. 27, 1999   (FR)   ................................. 99/01062

(51) Int. Cl.
*H04J 11/00* (2006.01)
(52) U.S. Cl. .................. 370/208; 370/203; 370/210; 342/368; 375/267
(58) Field of Classification Search ............... 370/203, 370/208, 210; 342/368; 375/267
See application file for complete search history.

(56) References Cited

U.S. PATENT DOCUMENTS

| | | | |
|---|---|---|---|
| 4,112,430 A | 9/1978 | Ladstatter ............... 343/100 R |
| 5,416,767 A | 5/1995 | Koppelaar et al. ............ 370/23 |
| 5,506,836 A * | 4/1996 | Ikeda et al. .................. 370/203 |
| 5,610,908 A | 3/1997 | Shelswell et al. ............ 370/210 |
| 5,657,313 A | 8/1997 | Takahashi et al. ............ 370/491 |
| 5,673,290 A | 9/1997 | Cioffi .......................... 375/260 |
| 5,682,376 A | 10/1997 | Hayashino et al. ........... 370/206 |
| 5,729,577 A | 3/1998 | Chen ............................ 375/334 |
| 5,732,068 A | 3/1998 | Takahashi et al. ........... 370/206 |
| 5,809,030 A | 9/1998 | Mestdagh et al. ............ 370/480 |
| 5,822,323 A * | 10/1998 | Kaneko et al. ............... 370/480 |
| 5,991,289 A | 11/1999 | Huang et al. ................. 370/350 |
| 6,058,101 A * | 5/2000 | Huang et al. ................. 370/208 |
| 6,148,024 A | 11/2000 | Ho et al. ...................... 375/222 |
| 6,285,654 B1 | 9/2001 | Marchok et al. ............. 370/208 |
| 6,304,611 B1 * | 10/2001 | Miyashita et al. ............ 375/260 |
| 6,433,718 B2 | 8/2002 | Strinnholm .................. 341/144 |
| 6,546,055 B1 * | 4/2003 | Schmidl et al. .............. 375/244 |
| 6,574,283 B1 * | 6/2003 | Sakoda et al. ................ 375/262 |

FOREIGN PATENT DOCUMENTS

DE    44 25 713 C1    4/1995
EP    0 820 171 A1    1/1998

* cited by examiner

*Primary Examiner*—William Trost, IV
*Assistant Examiner*—Toan D Nguyen
(74) *Attorney, Agent, or Firm*—Lisa K. Jorgenson; Eric M. Ringer; Seed IP Law Group PLLC

(57) ABSTRACT

A circuit for generating a cyclic prefix of a symbol comprised of a sequence of time samples, the prefix being the reproduction of the last samples of the symbol at the beginning of the symbol, the symbol being obtained by inverse Fourier transform of complex coefficients corresponding to respective frequencies. The circuit includes a multiplier that shifts the phase of each complex coefficient by a value proportional to its frequency, a memory for storing the samples at the beginning of the symbol, and a multiplexer that copies at the end of the symbol the stored samples.

22 Claims, 4 Drawing Sheets

GENERATION OF A GUARD INTERVAL IN A DMT MODULATION TRANSMISSION

CROSS-REFERENCE TO RELATED APPLICATION

This application is a continuation of U.S. patent application Ser. No. 09/491,685, filed Jan. 26, 2000, now pending, which application is incorporated herein by reference in its entirety.

BACKGROUND OF THE INVENTION

1. Field of the Invention

The present invention relates to discrete multitone modulation (DMT), and more specifically, to the generation of cyclic prefixes in a DMT modulation transmission. The DMT modulation is for example used by standards ADSL and ADSL-lite.

2. Discussion of the Related Art

In a DMT modulation, data coded in the form of complex frequency coefficients are, on the transmit side, translated into time samples by inverse fast Fourier transform (IFFT).

Figure 1:
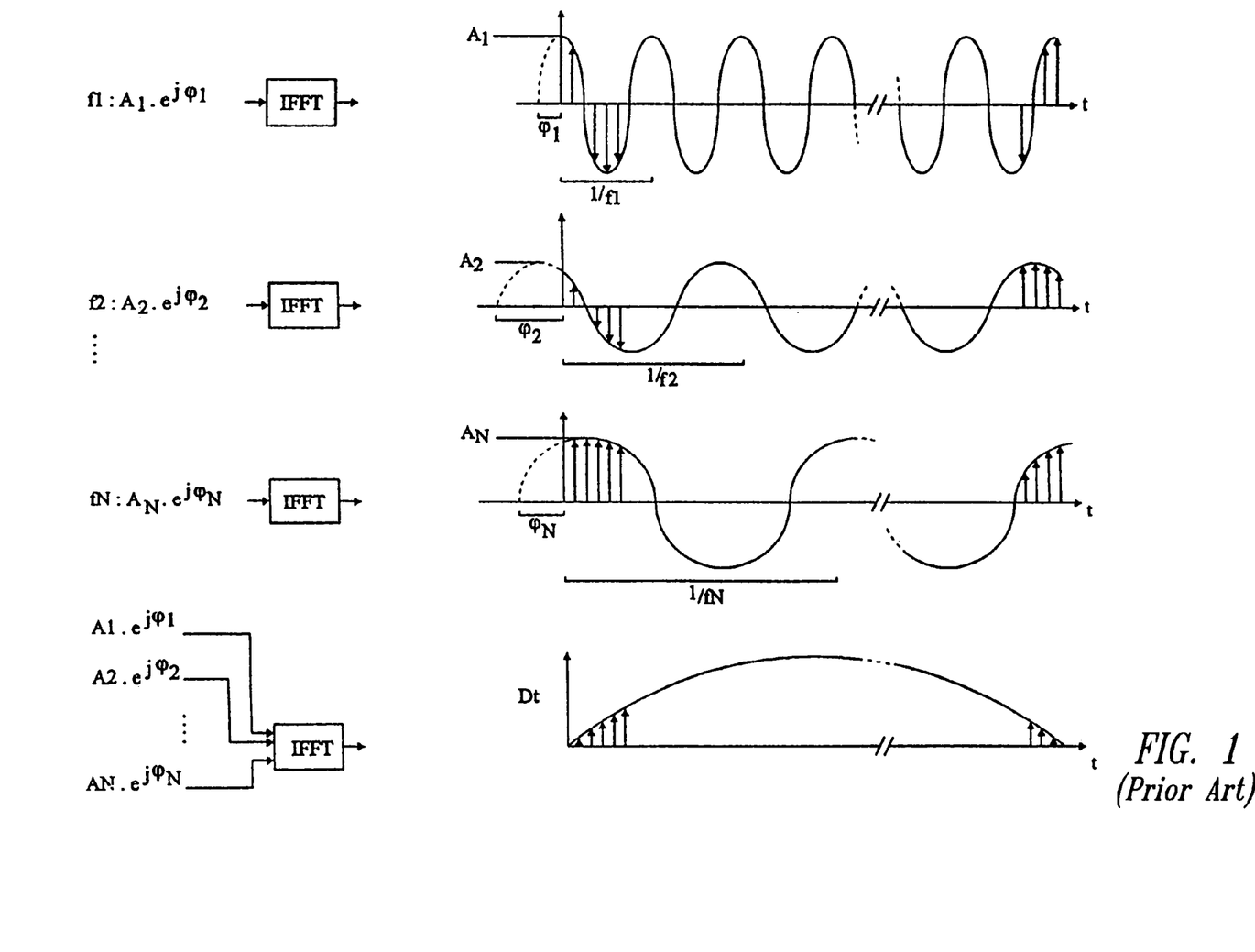
FIG. 1, previously described, illustrates an IFFT of a group of complex coefficients.

FIG. 1 illustrates the IFFT of a group of N complex coefficients $A_1.e^{j\phi_1}$ to $A_N.e^{j\phi_N}$. Each coefficient $A_i.e^{j\phi_i}$, where i is included between 1 and N, is associated with a respective frequency or tone $f_i$. The transform of a coefficient $A_i.e^{j\phi_i}$ is a sequence of digital samples in the time field, forming a section of a sinusoidal carrier of frequency $f_i$, of amplitude $A_i$, and of phase $\phi_i$. A first curve shows a sinusoid section of amplitude $A_1$, of period $1/f_1$ and of phase $\phi_1$, obtained by IFFT of a coefficient $A_1.e^{j\phi_1}$ associated with a frequency $f_1$. A second and a third curves show sections of sinusoids obtained by IFFT of coefficients $A_2.e^{j\phi_2}$ and $A_N.e^{j\phi_N}$, respectively associated with frequencies $f_2$ and $f_N$.

An IFFT of the group of coefficients $A_i.e^{j\phi_i}$ is formed by the sum of the sections of sinusoidal carriers obtained by IFFT of each of coefficients $A_i.e^{j\phi_i}$ for i included between 1 and N, this sum being called a "symbol". The IFFT of N coefficients provides a symbol $D_t$ formed of a succession of N complex digital samples $S_1$ to $S_N$. It should be noted that the shape of the symbol $D_t$ shown is not realistic, but aims at simplifying the under-standing of the present description.

The time samples obtained by IFFT are converted into analog to be transmitted, for example, by a telephone line. On the receive side, the analog signal of the line is converted into digital, and the resulting samples are converted into complex frequency coefficients by fast Fourier transform (FFT).

To suppress a number of problems due to interference between symbols appearing upon transmission of the symbols, a "cyclic prefix" (or guard interval) is interposed before each symbol. The cyclic prefix is the reproduction at the beginning of a symbol of the last samples of this symbol.

Figure 2:
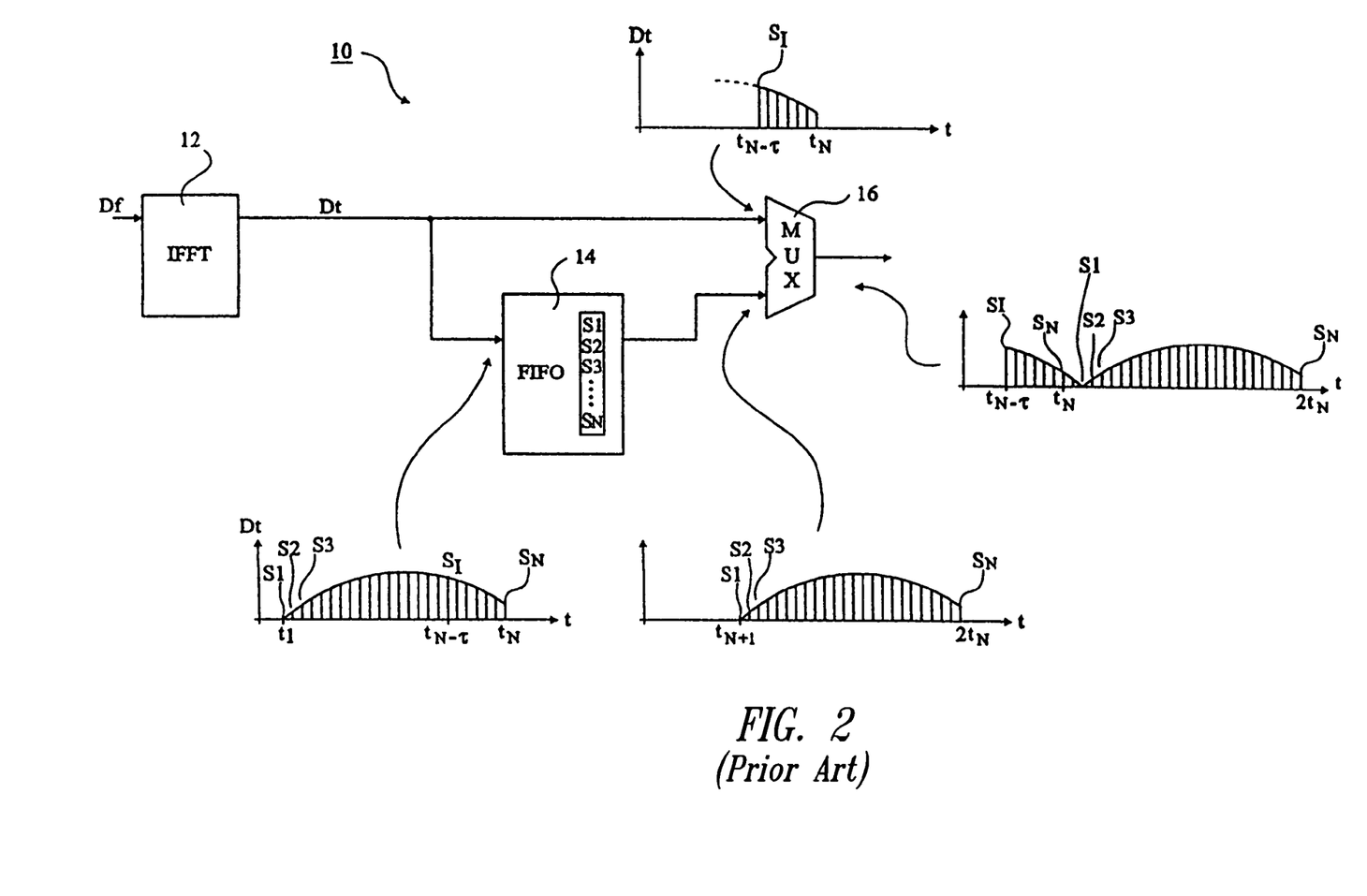
FIG. 2, previously described, illustrates the generation of a cyclic prefix by means of a circuit according to prior art.

FIG. 2 shows a conventional circuit 10 of introduction of a cyclic prefix of τ samples. The complex coefficients $A_i.e^{j\phi_i}$ for $i\epsilon[1, N]$ are provided to an IFFT circuit 12. IFFT circuit 12 generates from the group of complex coefficients a symbol $D_t$ comprised of N time samples $S_1$ to $S_N$. Symbol $D_t$ is provided to a memory of FIFO type 14 and to a first input of a multiplexer 16. The output of memory 14 is connected to a second input of multiplexer 16.

At a time $t_1$, IFFT circuit 12 provides a first sample $S_1$ of symbol $D_t$, and memory 14 is controlled in the write mode to store this sample and the following. Multiplexer 16 is switched to select the output of memory 14, which provides a sample of a preceding symbol. This configuration of circuit 10 remains unchanged until a time $t_{N-\tau}$.

At time $t_{N-\tau}$, memory 14 has ended providing the samples of the preceding symbol and it contains the samples of the current symbol $D_t$, to the last sample preceding the cyclic prefix. IFFT circuit 12 starts providing the prefix samples, which samples, designated as $S_I$ to $S_N$, continue being stored in memory 14. Meanwhile, multiplexer 16 is switched so that it transmits these prefix samples $S_I$ to $S_N$. This configuration of circuit 10 remains unchanged until a time $t_N$.

At time $t_{N+1}$, IFFT circuit 12 is stopped, memory 14 contains the entire current symbol $D_t$ and the prefix has just been transmitted. Multiplexer 16 is switched again to transmit the samples $S_1$ to $S_N$ provided by memory 14, that is, symbol $D_t$.

At a time $t_{N+\tau+1}$, IFFT circuit 12 is reactivated and it starts providing the samples of the next sample. Time $t_{N+\tau+1}$ corresponds for the next symbol to previously-described time $t_1$.

This configuration of circuit 10 remains unchanged until a time $2t_N$ when symbol $D_t$ will have been transmitted after its cyclic prefix.

Time $2t_{N+1}$ corresponds for the next symbol to previously-described time $t_{N-\tau}$.

A major disadvantage of circuit 10 is that the introduction of the cyclic prefix results in a delay $t_N$ (of N samples) in the transmission of symbol $D_t$. In some applications, such as telephone communications or other real time communications, the introduction of such a delay is not acceptable.

Besides, in prior art circuit 10, since the number N of samples may be high, memory 14 may have a large size.

SUMMARY OF THE INVENTION

An object of the present invention is to provide a cyclic prefix generation circuit that introduces a particularly low transmission delay.

Another object of the present invention is to provide such a circuit that uses a memory of reduced size.

To achieve these objects, the present invention provides a circuit for generating a cyclic prefix of a symbol comprised of a sequence of time samples, said prefix being the reproduction of the last samples of the symbol at the beginning of the symbol, the symbol being obtained by inverse Fourier transform of complex coefficients corresponding to respective frequencies, including means for shifting the phase of each complex coefficient by a value proportional to its frequency, a memory for storing the samples of the beginning of the symbol, and means for copying at the end of the symbol the stored samples.

According to an embodiment of the present invention, the means for shifting the phase of the complex coefficients include a multiplier connected to multiply each complex coefficient by a complex value having a unity norm and a phase proportional to the frequency associated with each coefficient.

According to an embodiment of the present invention, the memory is of FIFO type.

According to an embodiment of the present invention, the means for copying the stored samples include a multiplexer, a first input and a second input of which are respectively connected to the input and to the output of the memory.

The present invention further aims at a method for generating a cyclic prefix of a time symbol, said prefix being the reproduction of the last samples of the symbol at the beginning of the symbol, the symbol being obtained by inverse Fourier transform of complex coefficients corresponding to respective frequencies, that includes the steps of shifting the phase of each complex coefficient by a value proportional to the frequency with which it is associated, storing the samples of the beginning of the symbol, and copying the stored samples at the end of the symbol.

The foregoing objects, features and advantages of the present invention will be discussed in detail in the following non-limiting description of specific embodiments in connection with the accompanying drawings.

DETAILED DESCRIPTION

The present invention provides circularly shifting the samples of a symbol to which a cyclic prefix is desired to be added, this so that the last samples forming the symbol before shifting are at the beginning of the symbol after shifting, and thus directly form the prefix. By transmitting the symbol thus shifted, the prefix is first transmitted, followed by a portion of the symbol which only needs be completed by the prefix to restore the symbol. Thus, a delay equal to the prefix only is introduced in the transmission and it is sufficient to only store the prefix to be able to retransmit it to complete the symbol.

The circular shifting of the symbol must correspond to a same circular shifting of all the sinusoids that form the symbol. For this purpose, each complex frequency coefficient is multiplied by a complex factor causing a time shift, corresponding to the desired circular shift.

Figure 3:
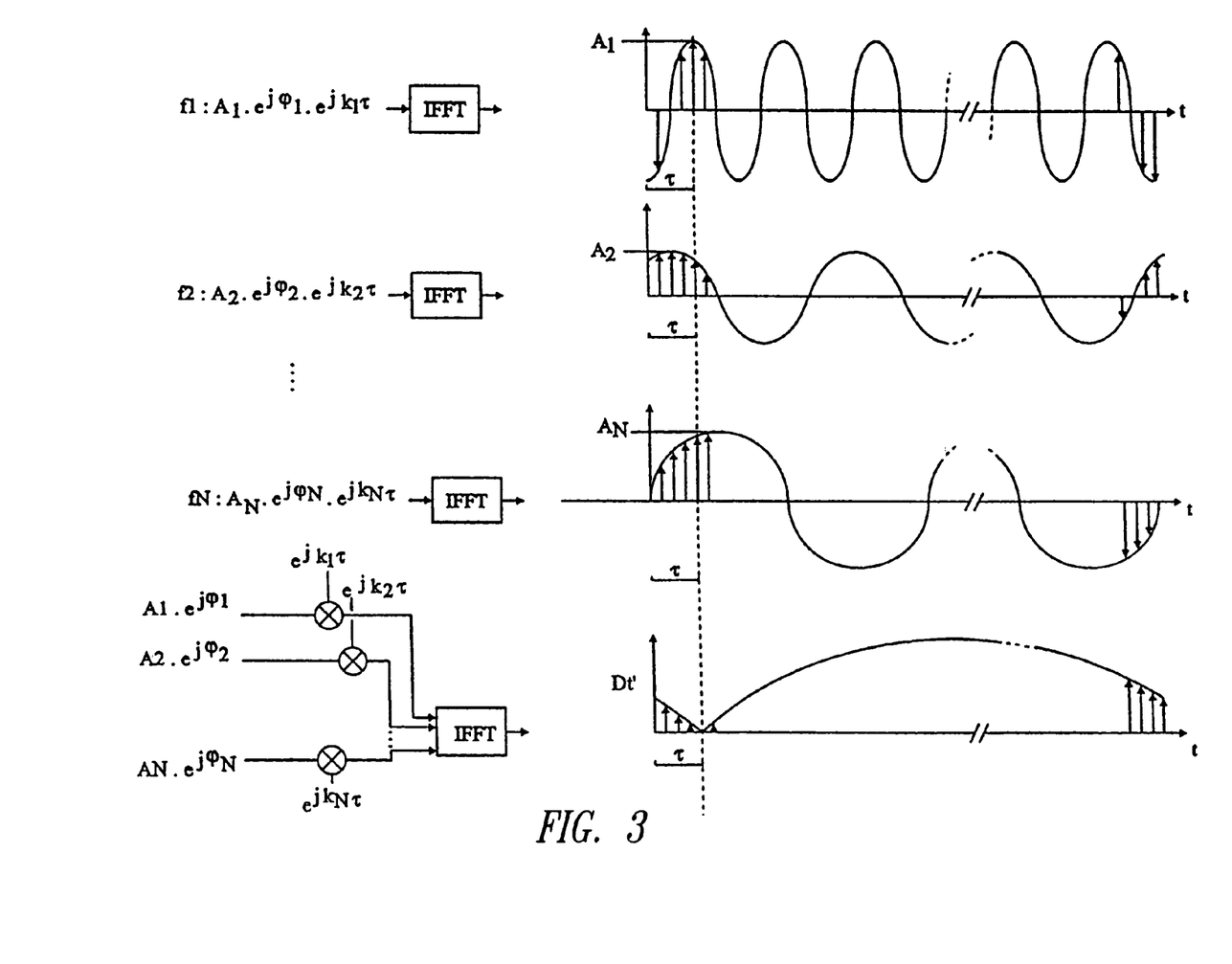
FIG. 3 illustrates an IFFT of a group of complex coefficients according to the present invention.

FIG. 3 is intended for illustrating this procedure in further detail. It illustrates the IFFT of a group of N complex coefficients $A_1.e^{j\phi 1}$ to $A_N.e^{j\phi N}$ multiplied according to the present invention by respective shifting coefficients $e^{jK1\tau}$ to $e^{jKN\tau}$. Multiplying a coefficient $A_i.e^{j\phi i}$ by a complex coefficient $e^{j\Delta\phi}$ amounts to modifying the phase $\phi_i$ by a value $\Delta\phi$. Phase shift $\Delta\phi$ causes a circular shifting of the corresponding sinusoid section by a value $\Delta\phi/2\pi f_i$, where $f_i$ is the frequency of the sinusoid section. This shift is not constant, but is a function of frequency $f_i$.

According to the present invention, the N complex coefficients $A_1.e^{j\phi 1}$ to $A_N.e^{j\phi N}$ are phase-shifted so that the corresponding sinusoid sections are all circularly shifted by a same value, or by the same number $\tau$ of samples. For this purpose, each coefficient $A_i.e^{j\phi i}$ is multiplied by a coefficient $e^{jK_i\tau}$, where $K_i$ is $2\pi f_i$. Thus, symbol $D_t'$ formed of the sum of the sinusoid sections corresponding to coefficients $A_i.e^{j\phi i}.e^{jK_i\tau}$, where i varies from 1 to N, corresponds to the preceding symbol $D_t$ having undergone a circular shifting by $\tau$ samples.

Coefficients $e^{jK_i\tau}$ are predetermined, and they can for example be stored in a ROM.

Figure 4:
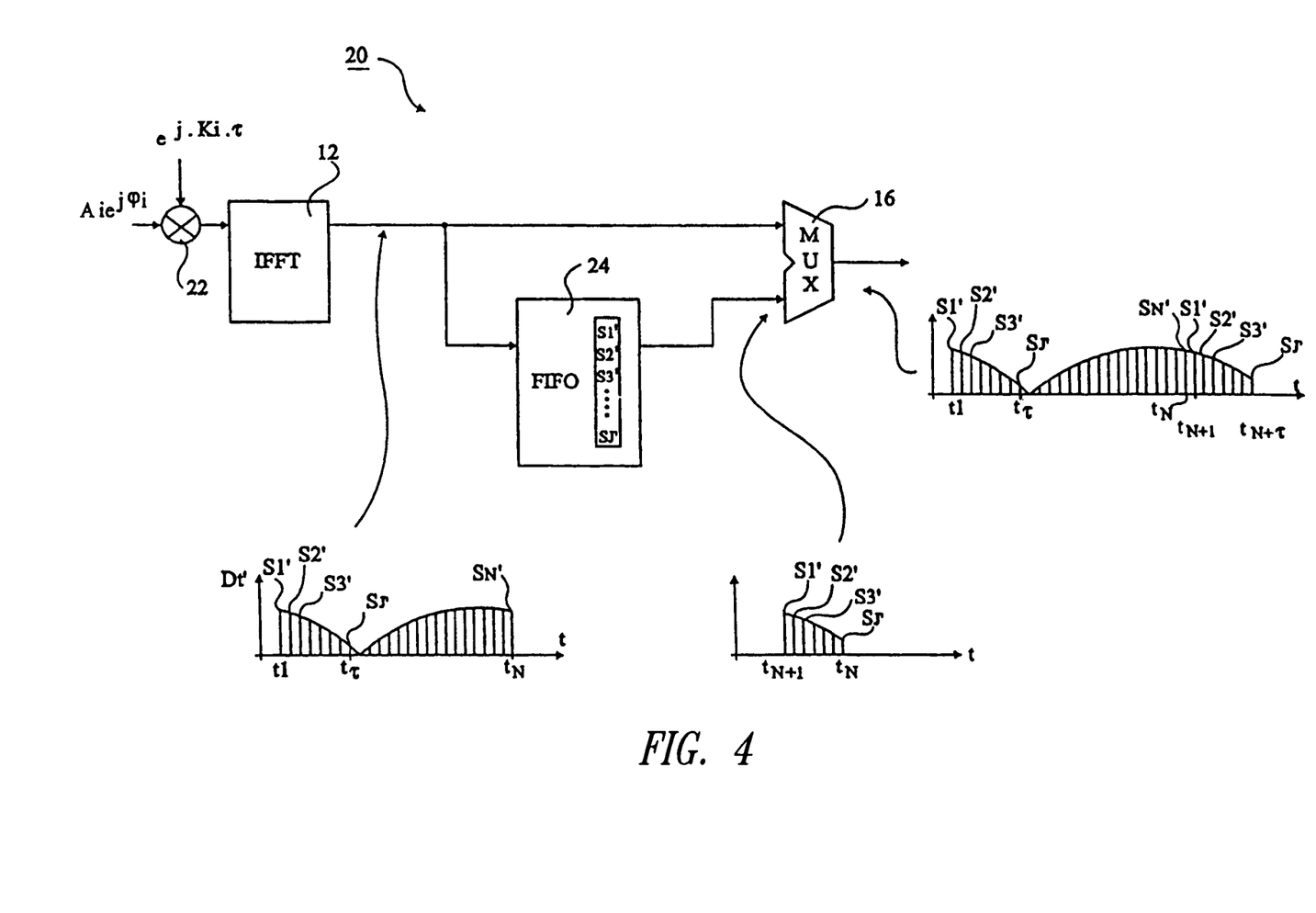
FIG. 4 illustrates an embodiment of a cyclic prefix generation circuit according to the present invention.

FIG. 4 shows an embodiment of a circuit 20 for generating a cyclic prefix according to the present invention. This circuit is similar to that of FIG. 2, and same references designate same elements. According to the present invention, complex coefficients $A_i.e^{j\phi i}$ for $i\in[1, N]$ are provided to IFFT circuit 12 via a complex multiplier 22, a second input of which correspondingly receives the above-mentioned N coefficients $e^{jK_i\tau}$.

As seen in relation with FIG. 3, symbol $D_t'$ provided by the IFFT circuit of FIG. 4 corresponds to symbol $D_t$ of FIG. 2 having undergone a circular shifting by $\tau$ samples. Thus, samples $S_1'$ to $S_\tau'$ of the first $\tau$ times of symbol $D_t'$ are samples $S_J$ to $S_N$ of the last $\tau$ times of symbol $D_t$. Samples $S_1'$ to $S_\tau'$ of symbol $D_t'$ form the cyclic prefix of symbol $D_t$, and the following samples of symbol $D_t'$ form the T-$\tau$ first samples of symbol $D_t$. To complete symbol $D_t$, it is enough to copy samples $S_1'$ to $S_\tau'$ after symbol $D_t'$. To achieve this, samples $S_1'$ to $S_\tau'$ will have been stored in memory 24, which memory must only store $\tau$ samples instead of N-$\tau$.

At a time $t_1$, IFFT circuit 12 provides the first sample $S_1'$ of symbol $D_t'$, and memory 24 is controlled in the write mode to store the samples generated by the IFFT circuit. Multiplexer 16 is switched to select the output of IFFT circuit 12. This configuration of circuit 10 remains unchanged until a time $t_\tau$; it enables storing samples $S_1'$ to $S_\tau'$ in memory 24 and providing at the output of multiplexer 16 the cyclic prefix, formed by samples $S_1'$ to $S_\tau'$.

At time $t_{\tau+1}$, memory 24, which has just stored samples $S_1'$ to $S_\tau'$, is deactivated. The position of multiplexer 16 is not modified, and this configuration of circuit 10 is maintained until a time $t_N$. Multiplexer 16 provides in this interval samples $S_{J+1}'$ to $S_N'$ of symbol $D_t'$, which correspond to previously described samples $S_1$ to $S_J$.

At time $t_{N+1}$, IFFT circuit 12 is stopped, memory 24 is controlled in the read mode to provide the first sample $S_1'$ that it contains, and multiplexer 16 is switched to select the output of memory 24. This configuration of circuit 10 remains unchanged until a time $t_{N+\tau}$. In this interval, multiplexer 16 successively provides samples $S_1'$ to $S_\tau'$ read from memory 24, which correspond to above mentioned samples $S_{J+1}$ to $S_N$.

At time $t_{N+\tau+1}$, IFFT circuit 12 is reactivated to provide the samples of the next symbol and the cycle just described is resumed as at time $t_1$.

The present invention enables generating the cyclic prefix of a symbol by only delaying the symbol by duration $\tau$ of the prefix. This is a time gain of $t_{N-\tau}$ with respect to prior art, which is particularly valuable in the case of real time transmissions.

Further, memory 24 used according to the present invention is of reduced size, since it is used to only store the samples forming the prefix.

Of course, the present invention is likely to have various alterations, modifications, and improvements which will readily occur to those skilled in the art. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A circuit for generating a cyclic prefix of a symbol, in time domain, comprised of a sequence of samples in the time domain, said sequence of samples having a first number (N) samples beginning at a first (1st) sample and ending at a last (Nth) sample, a subset of the sequence of samples has a second number (N–n) of samples starting at an intermediate sample (n), each respective sample between the intermediate sample, and the last (Nth) sample, where n is greater than or equal to 1 and less than N, said prefix being a reproduction of the subset of the samples of the symbol at a beginning of the symbol, the symbol being obtained by inverse Fourier transform of complex coefficients corresponding to respective frequencies, the circuit comprising:

means for shifting a respective phase of each complex coefficient by a value proportional to its frequency;

means for generating the sequence of samples in time domain of the symbol via an inverse Fourier transform on phase shifted complex coefficients such that said last samples of the symbol are shifted at the beginning of the symbol according to a circular permutation and such that the symbol is delayed by an amount of time for generating said prefix;
a memory for storing the subset of samples, wherein said memory stores only the subset of samples without storing any other sample of the symbol; and
means for copying at the end of the symbol the stored samples.

2. The cyclic prefix generation circuit of claim 1, wherein the means for shifting the respective phase of each complex coefficients includes a multiplier connected to multiply each complex coefficient by a complex value having a unity norm and a phase proportional to the frequency associated with each coefficient.

3. The cyclic prefix generation circuit of claim 1, wherein the memory is of FIFO type.

4. The cyclic prefix generation circuit of claim 1, wherein the means for copying the stored samples include a multiplexer, a first input and a second input of which are respectively connected to an input and to an output of the memory.

5. A method for generating a cyclic prefix of a symbol, in time domain, comprised of a sequence of samples in the time domain, said sequence of samples having a first number (N) samples beginning at a first ($1^{st}$) sample and ending at a last (Nth) sample, a subset of the sequence of samples has a second number (N−n) of samples starting at an intermediate sample (n), each respective sample between the intermediate sample, and the last (Nth) sample, where n is greater than or equal to 1 and less than N, said prefix being a reproduction of the subset of the samples of the symbol at a beginning of the symbol, the symbol being obtained by inverse Fourier transform of complex coefficients corresponding to respective frequencies, the method comprising:
shifting a phase of each complex coefficient by a value proportional respective the frequency with which it is associated;
performing an inverse Fourier transform on phase shifted complex coefficients to generate the samples of the symbol in time domain such that said subset of the samples of the symbol are shifted at the beginning of the symbol according to a circular permutation;
storing the subset of the samples of the beginning of the symbol in a buffer without storing any other sample of the symbol; and
copying the stored samples at the end of the symbol.

6. The method of claim 5, wherein the shifting the phase of the complex coefficients includes multiplying each complex coefficient by a complex value having a unity norm and a phase proportional to the frequency associated with each coefficient.

7. The method of claim 5, wherein the buffer is a FIFO memory.

8. The method of claim 5 wherein performing an inverse Fourier transform includes delaying the symbol by an amount of time for performing the inverse Fourier transform of said prefix.

9. A method for transmitting a symbol represented in a frequency domain by complex coefficients corresponding to respective frequencies, the method comprising:
shifting a phase of each complex coefficient by a value proportional to a frequency with which the complex coefficient corresponds;
transforming the symbol to a time domain by using an inverse Fourier transform circuit to perform an inverse Fourier transform on the phase-shifted complex coefficients to produce a set of samples as the symbol in the time domain; and
outputting the symbol in the time domain with a subset of the samples as a prefix of the symbol, wherein the set of samples is a sequence of samples that includes a first sample and a last sample, and the subset of samples includes at least the first sample, and wherein outputting the symbol in the time domain with the subset of the samples as a prefix of the symbol includes:
sequentially providing, from the inverse Fourier transform circuit, each sample of the subset of samples to a buffer and a multiplexer, wherein the multiplexer sequentially outputs each respective sample provided thereto;
sequentially providing, from the inverse Fourier transform circuit, each sample that is not a member of the subset of samples to the multiplexer after the subset of samples are provided to the multiplexer; and
sequentially providing, from the buffer, each buffered sample from the subset of samples.

10. The method of claim 9, wherein the shifting the phase of the complex coefficients includes multiplying each complex coefficient by a complex value having a unity norm and a phase proportional to the frequency associated with each coefficient.

11. The method of claim 9, further comprising storing the subset of the samples in a memory prior to outputting the symbol.

12. The method of claim 11 wherein the storing step stores the samples in a FIFO memory.

13. The method of claim 11, wherein the storing step stores only the subset of samples of the symbol without storing any of the samples of the symbol other than the subset.

14. The method of claim 9 wherein the subset of the samples are samples produced from the complex coefficients occurring at the end of the symbol in the frequency domain.

15. The method of claim 9, further comprising:
delaying the symbol by an amount of time for performing an inverse Fourier transform of said prefix; and
storing, prior to outputting the symbol, the shifted samples.

16. A method of operating a discrete multitone (DMT) modulation transmitter of a symbol represented by a set of frequency-domain complex coefficients, each frequency-domain corresponding to a respective frequency, the method comprising:
shifting a phase of each frequency-domain complex coefficient of the set of frequency-domain complex coefficients by a value proportional to the respective frequency with which the respective frequency-domain complex coefficient corresponds;
providing the phase shifted set of frequency-domain complex coefficients to an inverse Fourier transform circuit;
generating a set of time-domain samples by the inverse Fourier transform circuit performing an inverse Fourier transform on the phase shifted set of frequency-domain complex coefficients;
buffering a subset of the set of time-domain samples, the subset of the set of time-domain samples being less than the set of time-domain samples and greater than zero;
outputting the subset of time-domain samples as a prefix of the symbol; and
outputting the symbol in the time-domain after outputting the prefix of the symbol.

17. The method of claim 16 wherein the buffering a subset of the set of time-domain samples includes:
buffering only the time-domain samples that are members of the subset of the set of time-domain samples in a first-in first-out buffer without buffering any one of the time-domain samples that is not a member of the subset of the set of time-domain samples.

18. The method of claim 16 wherein the outputting the symbol in the time domain after outputting the prefix of the symbol includes:
sequentially providing each time-domain sample of the set of time-domain samples that is not a member of the subset of the set of time-domain samples to a multiplexer that sequentially outputs each respective sample provided thereto; and
sequentially providing each buffered time-domain sample of the subset of the set of time-domain samples to the multiplexer after the multiplexer outputs each time-domain sample that is not a member of the subset.

19. The method of claim 16 wherein the shifting the phase of each frequency-domain complex coefficient of the set of frequency-domain complex coefficients by the value proportional to the respective frequency with which the respective frequency-domain complex coefficient corresponds includes:
for each respective frequency-domain coefficient of the set of frequency-domain coefficients,
retrieving a respective complex number from storage,
providing the retrieved respective complex number and the respective frequency-domain coefficient to a complex multiplier, and
multiplying the retrieved respective complex number and the respective frequency-domain coefficient using the complex multiplier.

20. The method of claim 16 wherein the outputting the subset of time-domain samples as the prefix of the symbol includes:
setting a multiplexer having a first input coupled to the inverse Fourier transform circuit and a second input coupled to a memory to receive an input from the inverse Fourier transform circuit and to output received input, wherein the input is the set of time-domain samples.

21. The method of claim 20 wherein the memory is coupled to the inverse Fourier transform circuit and wherein buffering the subset of the set of time-domain samples includes:
activating the memory to a write mode for a first period of time coinciding with when the inverse Fourier transform circuit outputs the subset of the set of time-domain samples, wherein the inverse Fourier transform circuit outputs members of the set of time-domain samples that are not members of the subset of the set of time-domain samples during a second period of time that is subsequent to the first period of time; and
writing the subset of the set of time-domain samples into the memory.

22. The method of claim 21 wherein the outputting the symbol in the time-domain after outputting the prefix of the symbol includes:
maintaining the multiplexer to continue to receive the input from the inverse Fourier transform circuit during the second period of time and to continue to output the received input;
setting the multiplexer to receive an input from the memory for a third period of time subsequent to the second period of time and to output the received input;
activating the memory to a read mode during third period of time; and
during the third period of time, providing the multiplexer with the subset of the set of time-domain samples written into the memory.

\* \* \* \* \*

UNITED STATES PATENT AND TRADEMARK OFFICE
CERTIFICATE OF CORRECTION

PATENT NO. : 7,633,851 B2
APPLICATION NO. : 10/761708
DATED : December 15, 2009
INVENTOR(S) : Simone Mazzoni et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1730 days.

Column 1, line 25

The line "ficients $A_1.e^{j\phi 1}$ to $A_N.e^{j\phi N}$. Each coefficient $A_i.e^{j\phi i}$, where i" should read --ficients $A_1.e^{j\phi_1}$ to $A_N.e^{j\phi_N}$. Each coefficient $A_i.e^{j\phi_i}$, where i--.

Column 1, line 27

The line "frequency or tone $f_i$. The transform of a $A_i.e^{j\phi i}$ coefficient is a" should read --frequency or tone $f_i$. The transform of a coefficient $A_i.e^{j\phi_i}$ is a--.

Column 1, line 34

The line "obtained by IFFT of coefficients $A_2.e^{j\phi 2}$ and $A_N.e^{j\phi N}$, " should read --obtained by IFFT of coefficients $A_2.e^{j\phi_2}$ and $A_N.e^{j\phi_N}$, --.

Column 1, line 36

The line "An IFFT of the group of $A_i.e^{j\phi i}$ coefficients is formed by" should read --An IFFT of the group of coefficients $A_i.e^{j\phi_i}$ is formed by--.

Signed and Sealed this

Thirtieth Day of November, 2010

David J. Kappos
*Director of the United States Patent and Trademark Office*

CERTIFICATE OF CORRECTION (continued)

Column 1, line 38

The line "IFFT of each of coefficients $A_i.e^j\phi i$ for i included between 1" should read --IFFT of each of coefficients $A_i.e^{j\phi_i}$ for i included between 1--.

Column 1, line 55

The line "cyclic prefix of τ samples. The complex coefficients $A_i.e^j\phi i$" should read --cyclic prefix of τ samples. The complex coefficients $A_i.e^{j\phi_i}$--.

Column 3, lines 38-40

The lines "cients $A_1.e^j\phi 1$ to $A_N.e^j\phi N$ multiplied according to the present invention by respective shifting coefficients $e^{jK_1\tau}$ to $e^{jK_N\tau}$. Multiplying a coefficient $A_i.e^j\phi i$ by a complex coefficient $e^{j\Delta\phi}$" should read --cients $A_1.e^{j\phi_1}$ to $A_N.e^{j\phi_N}$ multiplied according to the present invention by respective shifting coefficients $e^{jK_1\tau}$ to $e^{jK_N\tau}$. Multiplying a coefficient $A_i.e^{j\phi_i}$ by a complex coefficient $e^{j\Delta\phi}$--.

Column 3, line 47

The line "cients $A_1.e^j\phi 1$ to $A_N.e^j\phi N$ are phase-shifted so that the corre-" should read --cients $A_1.e^{j\phi_1}$ to $A_N.e^{j\phi_N}$ are phase-shifted so that the corre--.

Column 3, line 50

The line "each coefficient $A_i.e^j\phi i$ is multiplied by a coefficient $e^{jK}i^\tau$," should read --each coefficient $A_i.e^{j\phi_i}$ is multiplied by a coefficient $e^{jK_i\tau}$, --.

Column 3, line 52

The line "sinusoid sections corresponding to coefficients $A_i.e^j\phi i.e^{jK}i^\tau$," should read --sinusoid sections corresponding to coefficients $A_i.e^{j\phi_i}.e^{jK_i\tau}$, --.

Column 3, line 55

The line "Coefficients $e^{jK}i^\tau$ are predetermined, and they can for" should read --Coefficients $e^{jK_i\tau}$ are predetermined, and they can for--.

CERTIFICATE OF CORRECTION (continued)
U.S. Pat. No. 7,633,851 B2

Column 3, line 61

The line "coefficients $A_i.e^j\phi i$ for $i \in [1, N]$ are provided to IFFT circuit 12" should read --coefficients $A_i.e^{j\phi_i}$ for $i \in [1, N]$ are provided to IFFT circuit 12--.

Column 3, line 64

The line " $e^{jK}i\tau$ " should read -- $e^{jK_i\tau}$ --.

Column 4, line 56
The line "second number (N-n) of samples starting at an intermediate" should read --second number (N-n+1) of samples starting at an intermediate--.

Column 5, line 28
The line "second number (N-n) of samples starting at an intermediate" should read --second number (N-n+1) of samples starting at an intermediate--.

Column 5, line 37
The line "proportional respective the frequency with which it is" should read --proportional to the respective frequency with which it is--.